(No Model.)

C. S. JONES.
COFFEE OR TEA POT.

No. 468,604.　　　　　　　Patented Feb. 9, 1892.

WITNESSES:
L. Douville
C. H. Eagles

INVENTOR
Conrad S. Jones
BY
John A. Wiedersheim
ATTORNEY.

UNITED STATES PATENT OFFICE.

CONRAD S. JONES, OF PHILADELPHIA, PENNSYLVANIA, ASSIGNOR TO MARY E. JONES, OF SAME PLACE.

COFFEE OR TEA POT.

SPECIFICATION forming part of Letters Patent No. 468,604, dated February 9, 1892.

Application filed February 24, 1891. Serial No. 382,549. (No model.)

*To all whom it may concern:*

Be it known that I, CONRAD S. JONES, a citizen of the United States, residing in the city and county of Philadelphia, State of Pennsylvania, have invented a new and useful Improvement in Coffee or Tea Pots, which improvement is fully set forth in the following specification and accompanying drawings.

My invention consists of a coffee or tea pot having a percolator formed of a vessel provided with reticulated sides, closed corners, and a closed top, said vessel being of the form of an inverted pyramid or cone, whereby the coffee or tea may be steeped and the fluid extract pass into the vessel, from whence it enters the pot, the grounds or leaves remaining separate from the fluid.

Figure 1:
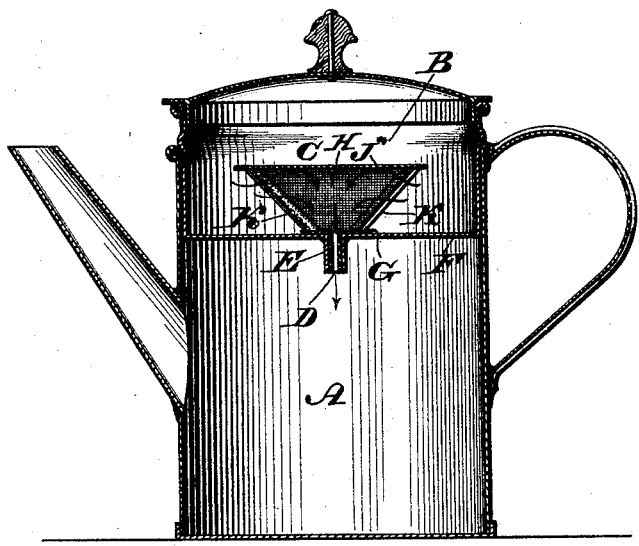
Figure 2:
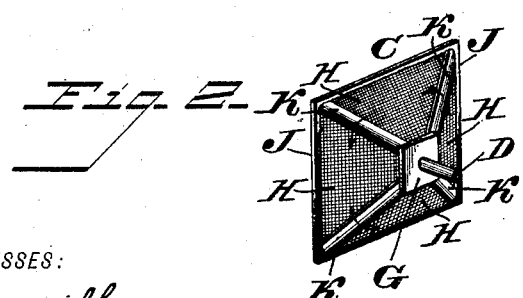

Figure 1 represents a vertical section of a coffee-pot embodying my invention. Fig. 2 represents a perspective view of a detached portion thereof.

Similar letters of reference indicate corresponding parts in the two figures.

Referring to the drawings, A designates a coffee-pot, which, excepting the feature of my invention applied thereto, is of well-known construction.

B designates the securing portion of the pot, the same being removably fitted on the body thereof and supporting a percolator C, which is provided with a discharge-tube D, the latter removably entering a pipe E, secured to the bottom F of the portion B, the percolator having a flat bottom G, which rests on said bottom F, whereby the percolator is nicely sustained in upright position.

The sides H of the percolator are formed of reticulated material, and the top J of the same is formed of a flat closed plate, it being noticed that the percolator is of the form of an inverted pyramid, and the corners are covered by plates K, which close the same, so that fluid is prevented from entering the percolator at said corners.

The operation is as follows: When the percolator is in position, as shown in Fig. 1, coffee or tea is placed on the top J, which forms a support for the same, and hot water poured into the portion B, whereby the coffee or tea is steeped. The fluid extract of the coffee or tea enters the percolator through the reticulated sides thereof, while the grounds remain outside of the same, said extract passing through the tube D into the pot proper. Owing to the solid corners or plates K, some of the fluid around the percolator is deflected laterally over said corners, so as to reach the reticulated sides, thus creating a circulation of the water and consequent agitation of the coffee-grounds or tea-leaves, whereby a more thorough extraction of the essence thereof is caused. Owing to the form of the percolator, whereby the widest part is at top, clogging of the same is prevented.

The plates K at the corners of the percolator may be on the inside or outside of the same; but in either case they close said corners and serve to sustain the reticulated sides and prevent the same from sagging, besides causing deflection of the water or fluid, as has been stated.

Having thus described my invention, what I claim as new, and desire to secure by Letters Patent, is—

1. A percolator consisting of a body of the form of an inverted pyramid with reticulated sides, a discharge-tube, and a closed flat bottom and top, said tube depending from said bottom, substantially as described.

2. A percolator having reticulated sides, a closed flat top and bottom, closed corners, and a tube depending from said bottom, substantially as described.

3. A percolator of the form of an inverted pyramid, constructed with reticulated sides H, closed corners K, a flat closed bottom plate G, with central discharge-tube D, and a flat closed top plate F, said parts being combined substantially as described.

CONRAD S. JONES.

Witnesses:
 JOHN A. WIEDERSHEIM,
 A. P. JENNINGS.